(12) United States Patent
Nádas et al.

(10) Patent No.: US 11,038,806 B2
(45) Date of Patent: Jun. 15, 2021

(54) FIRST COMMUNICATION NODE, METHOD PERFORMED THEREBY, COMPUTER PROGRAM AND COMPUTER-READABLE STORAGE MEDIUM FOR HANDLING PACKETS IN A COMMUNICATIONS NETWORK

(71) Applicant: Telefonaktiebolaget LM Ericsson (publ), Stockholm (SE)

(72) Inventors: Szilveszter Nádas, Budapest (HU); Gergö Gombos, Budapest (HU); Sandor Laki, Budapest (HU); Gergely Pongrácz, Budapest (HU); Zoltán Turányi, Szentendre (HU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/500,587

(22) PCT Filed: Dec. 8, 2017

(86) PCT No.: PCT/EP2017/082044
§ 371 (c)(1),
(2) Date: Oct. 3, 2019

(87) PCT Pub. No.: WO2018/188770
PCT Pub. Date: Oct. 18, 2018

(65) Prior Publication Data
US 2020/0127933 A1    Apr. 23, 2020

Related U.S. Application Data

(60) Provisional application No. 62/484,146, filed on Apr. 11, 2017.

(51) Int. Cl.
*H04L 12/24*    (2006.01)
*H04L 12/863*    (2013.01)
(Continued)

(52) U.S. Cl.
CPC ........ *H04L 47/6215* (2013.01); *H04L 41/142* (2013.01); *H04L 43/16* (2013.01); *H04L 47/32* (2013.01); *H04L 47/56* (2013.01)

(58) Field of Classification Search
CPC ....... H04L 41/142; H04L 43/16; H04L 47/31; H04L 47/32; H04L 47/56; H04L 47/6215
(Continued)

(56) References Cited

U.S. PATENT DOCUMENTS 7,002,980 B1*  2/2006  Brewer ................... H04L 47/10
                                                    370/229
7,586,848 B1*  9/2009  Gunduzhan ............. H04L 47/10
                                                    370/235
(Continued)

FOREIGN PATENT DOCUMENTS

EP    2663037 A1    11/2013
WO    2013085437 A1    6/2013
WO    2014189422 A1    11/2014

OTHER PUBLICATIONS

Laki, Sándor, et al., "Take your own share of the PIE", Eötvös Loránd University, Budapest, Hungary, Jul. 15, 2017, pp. 1-6.
(Continued)

*Primary Examiner* — Robert J Lopata
(74) *Attorney, Agent, or Firm* — Murphy, Bilak & Homiller, PLLC

(57) ABSTRACT

A method, in a first node, for handling one or more jobs, wherein said first node receives a job over an incoming link, which job comprises a job value, wherein said method comprises the steps of determining, by said first node, a deviation of a queuing delay of the first communication node from a target queuing delay value, and using, by said first node, said deviation as an error value to determine a dropping probability which is used to determine a threshold value, wherein said threshold value corresponds to or is
(Continued)

associated with a congestion level of a queue of the job, comparing, by said first node, the job value with the threshold value and establishing that said job value is below said threshold value, dropping, by said first node, said job based on said comparison.

8 Claims, 10 Drawing Sheets

(51) Int. Cl.
  *H04L 12/26* (2006.01)
  *H04L 12/823* (2013.01)
  *H04L 12/875* (2013.01)

(58) Field of Classification Search
  USPC .......................................................... 370/229
  See application file for complete search history.

(56) References Cited

U.S. PATENT DOCUMENTS

| | | | | |
|---|---|---|---|---|
| 2003/0189943 A1* | 10/2003 | Gorti | ...................... | H04L 47/56 370/412 |
| 2003/0225903 A1* | 12/2003 | Lodha | ................. | H04L 41/0896 709/232 |
| 2004/0196790 A1* | 10/2004 | Balakrishnan | .......... | H04L 47/30 370/232 |
| 2005/0286416 A1* | 12/2005 | Shimonishi | ......... | H04L 47/2416 370/229 |
| 2012/0188874 A1* | 7/2012 | Kumagai | ............. | H04L 47/2441 370/235 |
| 2014/0003242 A1* | 1/2014 | Nadas | ..................... | H04L 47/14 370/235 |
| 2016/0241484 A1* | 8/2016 | De Schepper | .......... | H04L 47/31 |
| 2016/0255009 A1* | 9/2016 | Ramaiah | ............. | H04L 47/2433 370/235 |
| 2016/0373361 A1* | 12/2016 | Dhanabalan | ............ | H04L 47/24 |
| 2017/0118108 A1* | 4/2017 | Avci | ........................ | H04L 45/36 |
| 2018/0083878 A1* | 3/2018 | Francini | ................... | H04L 47/33 |

OTHER PUBLICATIONS

Nádas, Szilvezter, et al., "Per Packet Value: A Practical Concept for Network Resource Sharing", 2016 IEEE Global Communications Conference, Dec. 4, 2016, pp. 1-7.

Natarajan, Pan P, et al., "PIE: A Lightweight Control Scheme to Address the Bufferbloat Problem", Cisco Systems; CableLabs, Sep. 26, 2016, pp. 1-26.

Varga, Balázs, et al., "Stateless Resource Sharing (SRS) Via Per Packet Value (PPV) Marking", (New Serious Method for Ensuring QOS Characteristics), Mar. 25, 2016, pp. 1-17.

Braden, et al., "Resource ReSerVation Protocol (RSVP)", Version 1 Functional Specification, RFC 2205, Sep. 1997, 112 pages.

Heinanen, et al., "Assured Forwarding PHB Group", RFC 2597, Jun. 1999, 12 pages.

Unknown, Author, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.4.0, Mar. 2014, 302 pages.

Unknown, Author, "3rd Generation Partnership Project; Technical Specification Group Services and System Aspects; General Packet Radio Service (GPRS); Service description; Stage 2 (Release 12)", 3GPP TS 23.060 V12.4.0, Mar. 2014, 345 pages.

Wang, et al., "Efficient QoS Over LTE—A Scheduler Centric Approach", 2012 IEEE 23rd International Symposium on Personal, Indoor and Mobile Radio Communications—(PIMRC), 2012, 7 pages.

* cited by examiner

FIRST COMMUNICATION NODE, METHOD PERFORMED THEREBY, COMPUTER PROGRAM AND COMPUTER-READABLE STORAGE MEDIUM FOR HANDLING PACKETS IN A COMMUNICATIONS NETWORK

First communication node, method performed thereby, computer program and computer-readable storage medium for handling packets in a communications network

TECHNICAL FIELD

Embodiments herein relate to a first communication node, a method performed therein, computer program, and a computer-readable storage medium. In particular, embodiments herein relate to handling one or more packets in a communications network.

BACKGROUND

In a typical communications network such as a radio communications network, wireless terminals, also known as mobile stations and/or user equipment (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for user equipments. In a forum known as the Third Generation Partnership Project (3GPP), telecommunications suppliers propose and agree upon standards for e.g. third generation networks and further generations, and investigate enhanced data rate and radio capacity.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g., eNodeBs in LTE, and the core network. As such, the RAN of an EPS has an essentially "flat" architecture comprising radio base stations without reporting to RNCs.

Packets are transported in a Core Network along paths in a transport network being parts of the communications network. Today two broad categories of transport networking are available. In one, called automatic, path selection is automatic, usually distributed, and, usually, follows the shortest path paradigm. Internet Protocol (IP) routing, IP/Multiprotocol label switching (MPLS), and Ethernet Shortest Path Bridging (SPB) clearly fall into this category. The other approach, called traffic engineering, is more circuit aware and relies on setting up explicit paths across the network, usually with resource reservation included. Generalized MPLS (GMPLS), MPLS-Transport Profile (TP), Provider Backbone Bridges Transport Profile (PBB-TP) and Resource Reservation Protocol (RSVP) all fall into this category.

Automatic solutions have low management burden, and in that most of the time relying on shortest paths the automatic solutions also achieve some form of low delay efficiency. They can be expanded with automatic fast reroute and Equal-Cost Multipath (ECMP) to increase reliability and network utilization. The automatic solutions, however, fail to offer adequate Quality of Service (QoS) measures. Usually simple packet priorities or DiffServ handling does not provide any bandwidth guarantees.

Traffic engineering solutions are focusing on reserving capacity to flows and are more suited to provide bandwidth guarantees, but path computation may be potentially very complicated in case alternative paths should be used for higher utilization. Also, robustness is usually achieved by reserving an alternative path, which is a waste of resources. Transport equipment, such as communication nodes, usually have very limited packet processing capabilities, usually limited to a few priority or weighted fair queues, a few levels of drop precedence, since emphasis is on high throughput and low price per bit.

There are two common ways of defining and signaling desired resource demands to a bottleneck in a communications network in for example a core network such as a packet network. A bottleneck being a location in the communications network where a single or limited number of components or resources affects capacity or performance of the communications network.

A first common way is to pre-signal/pre-configure the desired resource sharing rules for a given traffic aggregate, such as a flow or a bearer, to a bottleneck node prior the arrival of the actual traffic. The bottleneck node then implements the handling of the traffic aggregates based on these sharing rules, e.g. uses scheduling to realize the desired resource sharing. Examples for this pre-signaling/pre-configuration method are e.g. the bearer concept of 3GPP [3GPP TS 23.401 v12.4.0], SIRIG [3GPP TS 23.060 section 5.3.5.3, v12.4.0], or Resource Reservation Protocol (RSVP) [RFC2205]. An example scheduling algorithm for this method, implementing the 3GPP bearer concept at an LTE eNB, may be found in Wang Min, Jonas Pettersson, Ylva Timner, Stefan Wanstedt and Magnus Hurd, Efficient QoS over LTE—a Scheduler Centric Approach. Personal Indoor and Mobile Radio Communications (PIMRC), 2012 IEEE 23rd International Symposium. Another example of this is to base the resource sharing on Service Value as described in Service Value Oriented Radio Resource Allocation, WO2013085437.

A second common way is to mark packets with priority—this would give more resources to higher priority flows, or with drop precedence, which marks the relative importance of the packets compared to each other. Packets of higher drop precedence are to be dropped before packets of lower drop precedence. An example for such method is DiffServ Assured Forwarding (AF) within a given class [RFC2597]. Also such a method with several drop precedence levels are defined in a Per-Bearer Multi Level Profiling, EP2663037.

According to a Per Packet Value (PPV) concept a communication node associates packets with a value related to resource sharing. Thus, the communication node marks the packet with a value related to resource sharing in the physical network, wherein the value, also referred to herein as packet value, indicates a level of importance of the packet relative to the importance of other packets along a, e.g. linear, scale in the physical network. The communication node further transmits, over the physical network, the marked packet towards a destination node. Thus, the basic concept of per packet marking based bandwidth sharing control method is the following. At an edge communication node each packet gets a label that expresses its importance. In a bottleneck node these labels or packet values are used in a bandwidth sharing decision. Packets of a flow can have different importance values to first drop packets with lowest importance, for example, in case of congestion.

In [1,2], relating to the Per Packet Value concept also referred to as Per Packet Operator Value (PPOV) concept, methods are proposed to control bandwidth sharing among flows even when per flow queuing is not possible. Both concepts are based on per packet marking based bandwidth sharing control. Algorithms are defined for a single buffer, which results in a shared delay among these packet flows. In [4] a packet filter based method is described.

PPV schedulers described so far require dropping from the middle of the queue (drop smallest PPV first). This might be too processing/memory intensive for some practical communication nodes such as routers. Alternatively, their chipset may only support drops on packet arrival and not later. This results in a non-flexible solution limiting or reducing performance of the communications network.

SUMMARY

An object of embodiments herein is to provide a mechanism that uses resources in a communications network in an efficient manner.

According to a first aspect the object is achieved by providing a method in a first communication node for handling one or more packets, e.g. towards a destination node, in a communications network. The first communication node receives the packet over an incoming link from a second communication node, which packet comprises a packet value. The first communication node further determines a deviation of a queuing delay of the first communication node from a target queuing delay value and use this deviation as an error value to determine a dropping probability which is used to determine a threshold value also referred to as PPV limit. The first communication node compares the packet value with the threshold value. The threshold value corresponds to or is associated with a congestion level of a queue of the packet. The first communication node further determines whether to drop or to transmit e.g. forward the packet to the queue for the outgoing link based on the result of the comparison.

According to another aspect the object is achieved by providing a first communication node for handling one or more packets in a communications network. The first communication node is configured to receive a packet over an incoming link from a second communication node, which packet comprises a packet value. The first communication node is further configured to determine a deviation of a queuing delay from a target queuing delay value and to use this deviation as an error value to determine a dropping probability which is used to determine a threshold value, also referred to as PPV limit. The first communication node is further configured to compare the packet value with the threshold value. The threshold value corresponds to or is associated with a congestion level of a queue of the packet. The first communication node is further configured to determine whether to drop or to transmit or forward the packet to the queue for the outgoing link based on the result of the comparison.

According to yet still another aspect the object is achieved by providing computer programs comprising instructions, which, when executed on at least one processor, cause the at least one processor to carry out the methods according to the methods herein, as performed by the first communication node.

According to yet still another aspect the object is achieved by providing a computer-readable storage medium comprising a computer program, which computer program comprises instructions which, when executed on at least one processor, cause the at least one processor to carry out the methods herein, as performed by the first communication node.

Thus, it is herein proposed a combination of a PPV resource sharing framework with a queue management algorithm e.g. a PIE algorithm.

In some embodiments the queue management algorithm is ran for the queue or packet queue and the first communication node may maintain the target Queuing Delay value by determining the dropping probability using e.g. the PIE concept. Then the first communication node may determine the expected PPV limit such as a congestion threshold value (CTV), which usage of the PPV limit results, when being implemented, in the determined dropping probability. This PPV limit is set as a packet filter for the queue, and the first communication node may drop all packets with a packet value smaller than the determined PPV limit.

Alternatives to determine the PPV limit from the dropping probability are also herein provided. The most straightforward how to determine the PPV limit from the determined dropping probability, also referred to as target dropping probability, is to maintain a distribution function such as an Empirical Cumulative Distribution Function (ECDF) of the incoming Packet Values and determine the PPV limit as the Packet Value at that determined dropping probability.

A less storage intensive solution is to estimate the derivative of the distribution function such as the ECDF at a current working point of the system and also take into account the deviation or difference between a desired and an actual packet drop/mark in a last period or time interval. Direct control of the PPV limit based on the target queuing delay value is also possible with a controller such as a Proportional Integral controller Enhanced (PIE).

Embodiments herein allow controlling resource sharing among flows, even for queues, where e.g. only arrival drop is possible, and requires a rather quick and non-complex implementation.

In a further aspect of the present disclosure, there is provided a method of queue management in a processing system, wherein said system comprises a processing queue comprising jobs to be processed and wherein said system comprises at least one incoming queue comprising incoming jobs, wherein each incoming queue is arranged to output the incoming jobs to the processing queue for processing of the incoming jobs, wherein each incoming queue is associated with a value filter for determining whether incoming jobs are to be placed in said corresponding incoming queue, wherein said method comprises the steps of:

receiving, by said at lease one value filter, a job to be processed, wherein said job to be processed is associated with a job value;

determining, by at least one said value filter, that said job value of said job to be processed is below a job threshold value, wherein said job threshold value is associated with a latency of processing jobs in said processing queue;

dropping, by said value filter, said job to be processed.

One of the concepts of the present disclosure is directed to the idea to combine controller based Value filtering and drop smallest Value first dropping and keeping the advantages of both.

A controller may set the Value filter. That controller may target controlled loss in the servers' queue, e.g. below 50%, instead of directly controlling queuing delay as in prior art.

All packets/jobs not filtered by the Value filter, e.g. not dropped by the value filter, are put into the server's queue. When the delay in that queue becomes too large the AQM drops the packet/job with smallest Value. The AQM also periodically reports the number of lost and served packets/jobs to the controller controlling the Value filter, which allows the controller to recalculate the Value filter.

One of the advantages of the above is that it keeps the precision of drop smallest PV first solution with controlled extra AQM processing. Another advantage is related to the simplified controller design. This solution puts much smaller stability requirements on the controller setting the PV filter: a large range of actual drop percentages, e.g. 1% to 100%, by the drop smallest PV first AQM may be acceptable.

An VM process has a process queue, which stores jobs to be performed, for example, packets to be processed. Each process queue is fed by one or more input queues, which are used by other processes to feed the VM process. The "AQM process" is responsible for moving jobs from the input queues to the process queue and to drop jobs in case of overload. Each job has a Value associated with it, similarly to the Packet Value in the PPV concept. When the Process Queue becomes too large the job(s) with the smallest Value are dropped. In this case pre-processing by the Incoming queues and by the AQM process is wasted. The dropping itself also requires processing. When the job rate becomes large this will decrease the performance of the system.

To decrease the amount of unnecessary processing we introduce "Value filters" to the system. A Value filter has a Value limit configured to it and all jobs with Value smaller than the limit are dropped early at this point. The value limit is set by a controller which is fed by queuing delay and drop data (total number of jobs, dropped jobs) in the "process queue" and drop data in the "Value filters". The controller is similar to the one described in, but it has relaxed requirements, because the actual queue length is kept by the AQM process dropping jobs from the process queue. Depending on the actual problem to be solved the drop rate by the AMQ process can be e.g. 1-50%, and only the rest of the jobs has to be dropped by the Value Filter, in case of high overload.

Also, this solution makes overshoots a smaller issue as the AQM process can handle those.

The "Value filters" may be updated regularly, e.g. every 10-100 ms, they can be put to the earliest point when the server of the jobs is known, in a preferred case to the entry point of the system. In this way unnecessary pre-processing (or even the transmission to the server) can be minimized.

In an example, the controller may receive statistics from the filters about how many packets were dropped/passed. Such information may be used for providing insight in the total workload of the system.

In an example, the processing system further comprises a controller, and wherein said method further comprises the step of:

determining, by said controller, said latency of processing jobs in said processing queue;

updating, by said controller, said job threshold value of said at least one value filter based on said determined latency.

In a further example, the method further comprises the steps of:

comparing, by said controller, said determined latency with a predefined latency value, and updating, by said controller, said job threshold value of said at least one value filter based on said comparison.

In another example, the method further comprises the step of:

updating, by said controller, said job threshold value of said at least one value filter based on a momentary processing load of said processing system.

In a further aspect, there is provided a first node arranged for handling one or more jobs, wherein said first node is arranged to receive a job over an incoming link, which job comprises a job value, wherein said first node is arranged for:

determining a deviation of a queuing delay of the first communication node from a target queuing delay value, and using said deviation as an error value to determine a dropping probability which is used to determine a threshold value, wherein said threshold value corresponds to or is associated with a congestion level of a queue of the job;

comparing the job value with the threshold value and establishing that said job value is below said threshold value;

dropping said job based on said comparison.

In an example, said first node is further arranged for:

maintaining a distribution function of the job values, and determining the threshold value based on said maintained distribution function.

In a further example, the first node is further arranged for:

estimating a derivative of a distribution function at a working point, and determining the threshold value based on said estimate and based on the deviation or difference between a desired and an actual job drop level.

In yet another example, the job is a packet and wherein said job value is a packet value.

BRIEF DESCRIPTION OF DRAWINGS

Embodiments will now be described in more detail in relation to the enclosed drawings, in which.

DETAILED DESCRIPTION

Figure 1:
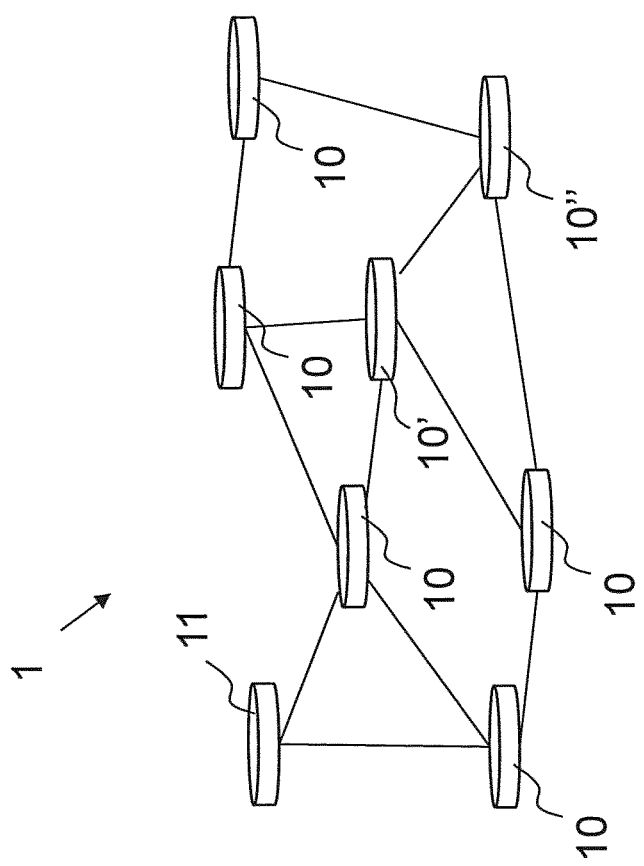
FIG. 1 shows a schematic overview depicting a communications network according to embodiments herein.

FIG. 1 is a schematic overview depicting a communications network 1 according to embodiments herein. The communications network 1 comprises a plurality of communication nodes 10 such as a first communication node 10' and a second communication node 10". Packets are transported over the communications network 1 to a receiving node or a destination node 11, which is also a communication node. The first communication node 10' may be a router, a switch, an application server, or any node with a scheduler or a packet handler transporting one or more packets within the communications network 1, e.g. a radio network node such as a base station or similar. During the transport of a packet, the first communication node 10' receives, e.g. from the second communication node 10", the packet with a packet value, which packet value may indicate a level of importance of the packet e.g. a priority level or similar. The first communication node 10' determines a deviation of a queuing delay of a queue of the first communication node 10' from a target queuing delay value, i.e. a predefined expected value. This may be referred to as the first communication node 10' determines a difference of the queuing delay and the target queuing delay value. The first communication node 10' uses this deviation (difference) as an error value to determine a dropping probability which is used to adjust or determine a threshold value also referred to as PPV limit. The first communication node 10' compares the packet value with the threshold value. The threshold value may correspond to or be associated with a congestion level of the queue of the packet. The first communication node 10' further determines whether to drop or to transmit (forward) the packet to the queue for the outgoing link based on the result of the comparison.

Reference [3] shows an input filtering method applying random packet drop/marking for incoming packets. A Proportional Integral controller Enhanced (PIE) scheduler in the prior art cannot control the resource sharing among different flows [3]. Firstly, it assumes a given Congestion Control (CC) behavior e.g. a Transport Control Protocol (TCP) friendly behavior. A flow with a different CC behavior will get an unfair share or can even dominate all other flows. Secondly it is not possible to define rich resource sharing policies among flows as the PPV framework allows. Furthermore, equal drop probability for all flows would not result in the desired resource sharing as defined by the PPV concept. Embodiments herein may extend the packet marking-based bandwidth sharing control, such as the PPV concept, with lightweight proactive mechanisms similar to the PIE that react on congestion situations earlier than when the queue is full, this may reduce the observed queuing delays and may ensure the bandwidth share is defined by a marking policy between flows.

Controller-based active queue management (AQM) methods called PPOV-AQM using a controller e.g. a proportional-integral (PI), a proportional-derivative (PD), a proportional-integral-derivative (PID) controller, etc, are herein suggested to continuously determine the deviation of queuing delay from the target queuing delay and use this deviation as the error value to adjust the threshold value used e.g. in a packet value-based packet filter also referred to as a filter. The packet value-based packet filter then simply drops or marks (as in the PIE) every incoming packet with a packet value less than the threshold value. The controller may update the threshold value periodically (e.g. in every T milliseconds).

Figure 2:
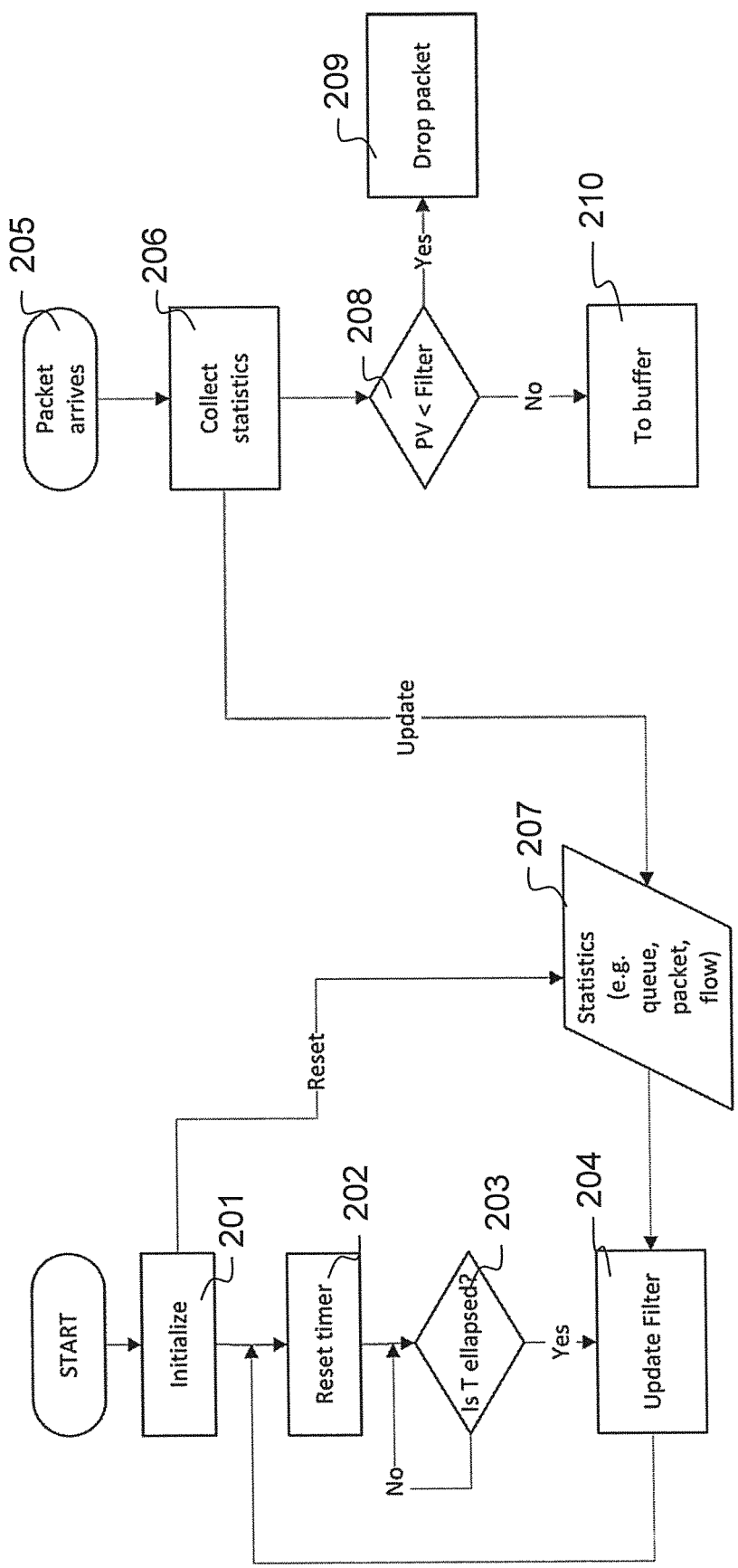
FIG. 2 shows a schematic flowchart according to embodiments herein.

Embodiments are depicted on FIG. 2 where after launching the system, the method first initializes, action 201, the statistical variables and reset a timer, action 202. After time T has elapsed, see action 203, the first communication node 10' updates the threshold value, action 204, (packet filter) by e.g. applying one or more controllers and the collected statistics. Each time a packet arrives, action 205, into the system, statistics are collected, action 206, and then statistics are updated, action 207, and the packet filter is applied: if the packet value of the incoming packet (marked by PV) is less than the threshold value (denoted Filter), action 208, the packet is simply dropped, action 209, otherwise it is forwarded to the buffer, action 210.

It is herein provided an indirect, a direct and a compound PPOV-AQM method that apply different strategies to update the filter and thus control the threshold value ("Update Filter" action 204 in FIG. 2). The goal of the proposed methods is to keep the queuing delay at an expected level and in parallel to ensure the predefined resource sharing policies at any congestion levels, setting the PPV limit (also known as threshold value, congestion threshold value (CTV) or filter threshold) accordingly. The efficiency and applicability of the proposed solution have been examined and proved by simulations.

Indirect Method

Figure 3:
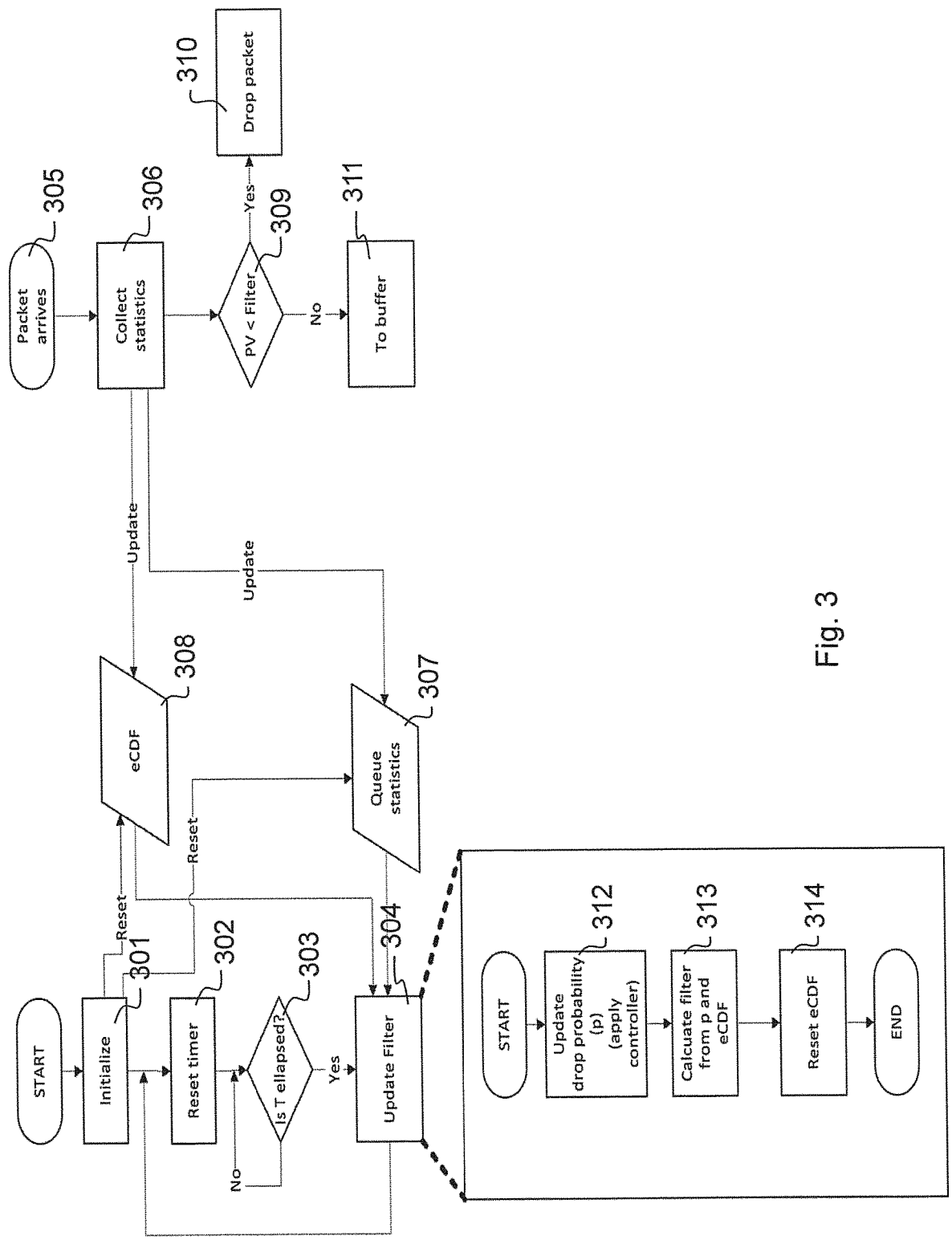
FIG. 3 shows a schematic flowchart according to embodiments herein.
Figure 4:
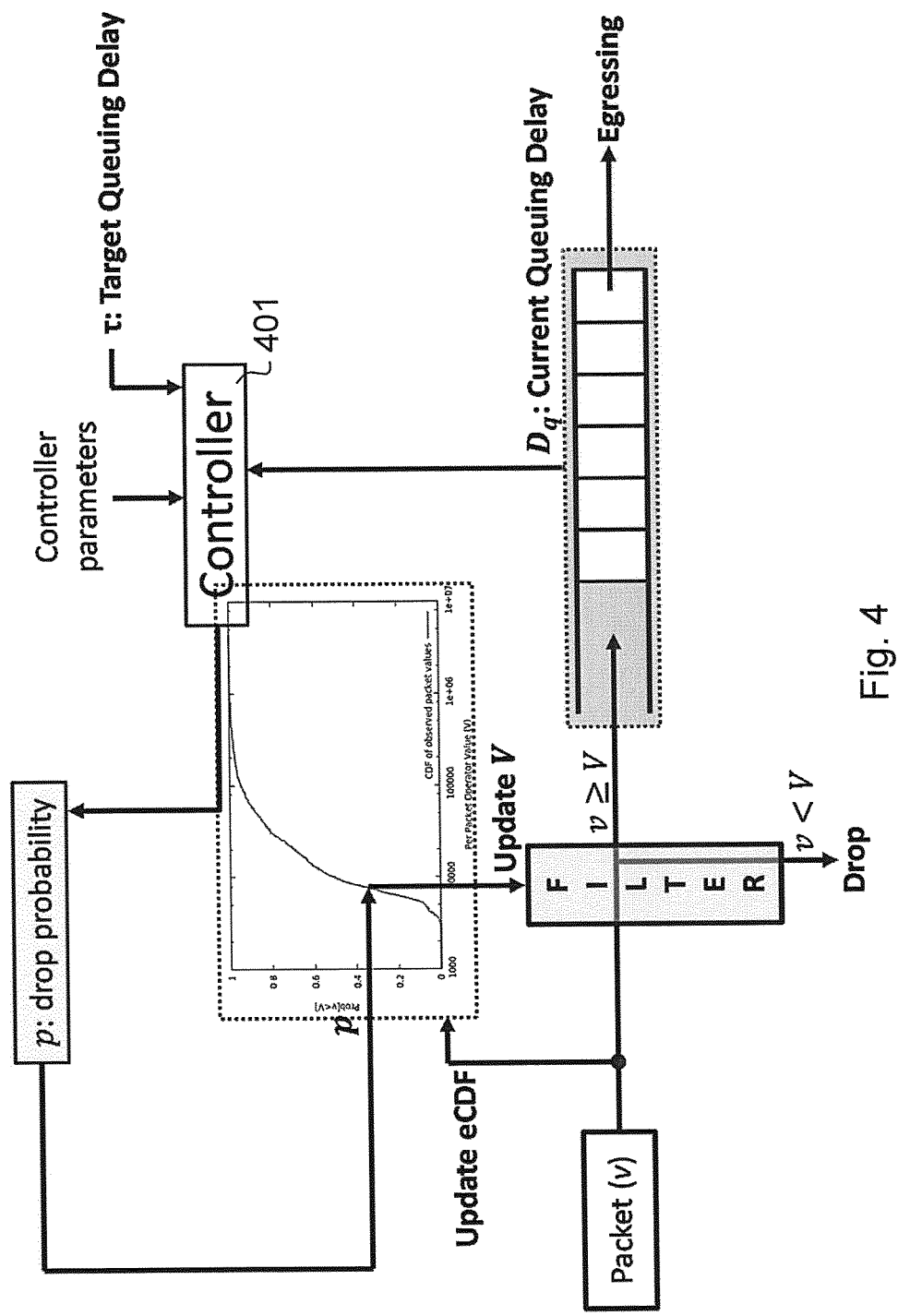
FIG. 4 shows a schematic overview depicting a first communication node according to some embodiments herein.

The indirect method is depicted in FIG. 3 and FIG. 4. The method first initializes, action 301 corresponds to action 201 in FIG. 2, the statistical variables and reset a timer, action 302 corresponds to action 202 in FIG. 2. After time T has elapsed, see action 303 corresponds to action 203 in FIG. 2, the first communication node 10' updates the threshold value, action 304 corresponds to action 204 in FIG. 2, (packet filter) by e.g. applying one or more controllers and the collected statistics. Each time a packet arrives, action 305 corresponds to action 205 in FIG. 2, into the system, statistics are collected, action 306 corresponds to action 206 in FIG. 2, and then statistics are updated, action 307 corresponds to action 207 in FIG. 2, and further packet values are collected into a distribution function such as a ECDF action 308. The packet filter is then applied: if the packet value of the incoming packet (marked by PV) is less than the threshold value (denoted Filter), action 309 corresponds to action 208 in FIG. 2, the packet is simply dropped, action 310 corresponds to action 209 in FIG. 2, otherwise it is forwarded to the buffer, action 311 corresponds to action 210 in FIG. 2.

Furthermore, the method works in two steps: the first communication node 10' may calculate the expected dropping probability needed for ensuring the expected queuing delay ($\tau$), action 312, and then 2) according to the distribution function of observed packet values (empirical cumulative distribution function (eCDF)) and the expected dropping probability the PPV limit (also denoted filter) is set or calculated, action 313. For example, for a given dropping probability p at time t, the PPV limit, Vnew, is calculated from the empirical cumulative distribution function of the observed packet values (eCDF) as $$V\_new = eCDF\_t^{(-1)}(p),$$

where eCDF_t^(−1) (.) is the inverse function of eCDF of observed packet values at time t, connecting the expected dropping probability p to a PPV limit. After the PPV limit is calculated the eCDF can be reset (e.g. dropping old measurements), action 314. The controller updates the PPV limit periodically in every T seconds.

An example implementation is shown in FIG. 4. For estimating p, a controller 401 such as a PI or a PID controller similarly to [3] may be built and implemented where the new target dropping probability p_new is set to minimize an observed error ($D\_q$ (t)−$\tau$). This controller 401 can be formalized as follows:

$$p\_new = p\_old + P \times error(t) + I \times \int\_{(x=0)}^{t} error(x)dx + D \times (derror(t))/dt,$$

where P, I and D are the controller parameters; constants for proportional, integral and derivative terms, resp.; error(t) is the error at time t (calculated as ($D\_q$ (t)−$\tau$), the difference of the current and the expected queuing delays); p_old denotes the dropping probability calculated in the previous iteration. The p_new may be used to update the new PPV limit, e.g. taken from a graph illustrating the relation between p and V.

Direct Method

Figure 5:
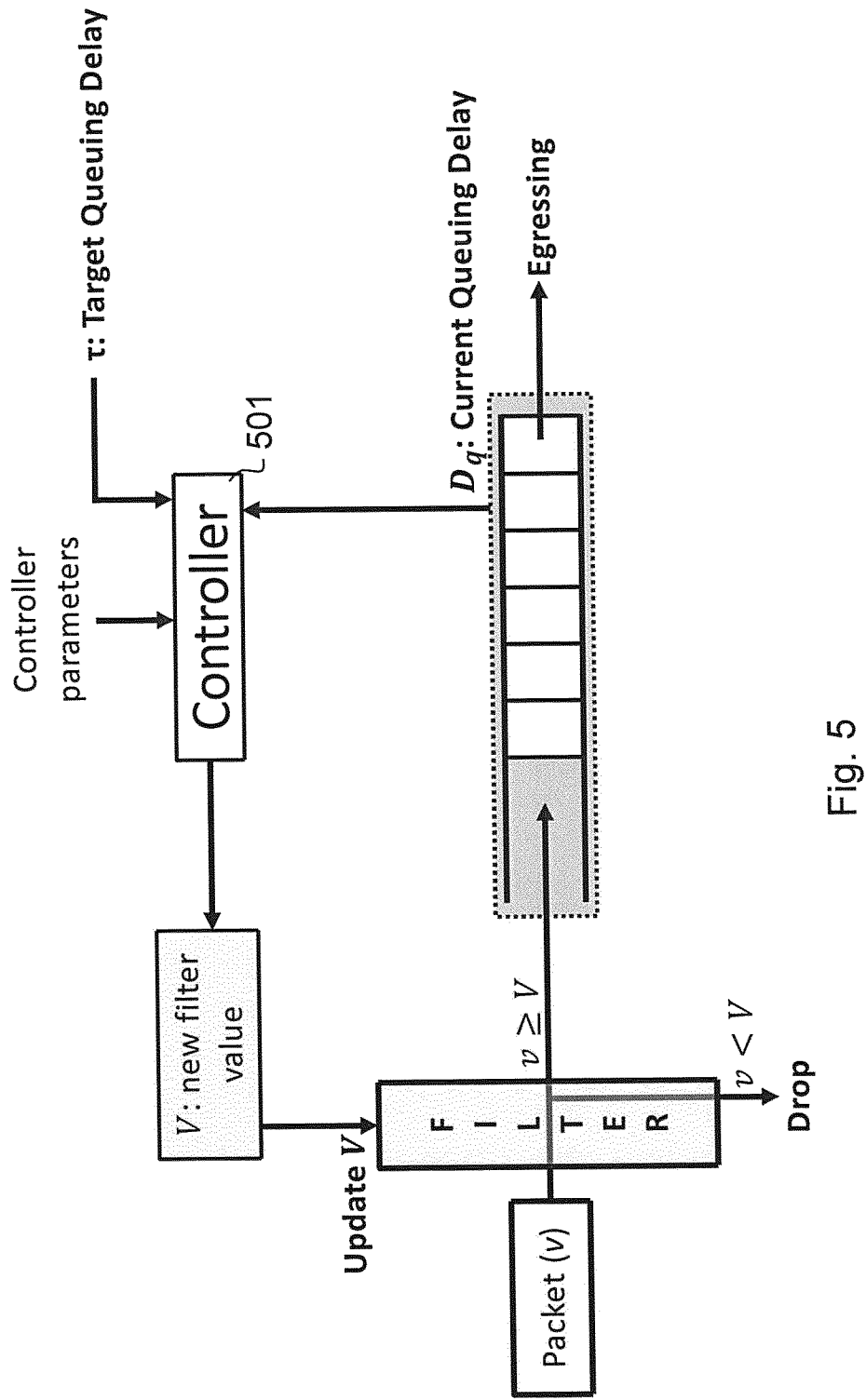
FIG. 5 shows a schematic overview depicting a first communication node according to some embodiments herein.

The direct PPOV-AQM method relies on a controller 501 that uses the deviation of current queuing delay ($D\_q$) for a predefined target value (i) as error. The controller 501 aims at minimizing this error and directly calculates the PPV limit to be applied in the filter accordingly, as depicted in FIG. 5. The flowchart is the same as FIG. 2 where "Update Filter" represents a single controller. When the PPV limit (V) is updated the packet value (v) of every incoming packet is checked, and if v<V, it is dropped, otherwise it is forwarded to the buffer. The controller updates the PPV limit periodically in every T seconds.

An example implementation: A direct PPOV-AQM method could for example use a PID controller as the controller 501 to update the filter at time t as $$V\_new = V\_old + P \times error(t) + I \times \int\_{(x=0)}^{t} error(x)dx + D \times (derror(t))/dt,$$

where P, I and D are the controller parameters; constants for proportional, integral and derivative terms, resp.; error(t) is the error at time t (calculated as ($D\_q$ (t)−$\tau$), the difference of the current and the expected queuing delays); V_old denotes the PPV limit set in the previous iteration.

According to a compound PPOV-AQM method, the method first initializes, action 601 that corresponds to actions 201 and 301, the statistical variables and reset the timer, action 602 that corresponds to actions 202 and 302. After time T has elapsed, see action 603 that corresponds to actions 203 and 303, the first communication node 10' updates the threshold value, action 604 that corresponds to actions 204 and 304, (packet filter) by e.g. applying one or more controllers and the collected packet statistics and Queue statistics. Each time a packet arrives, action 605 that corresponds to actions 205 and 305, into the system, statistics are collected, action 606 that corresponds to action 206 and 306, and then packet statistics are updated, action 607, and further Queue statistics are updated, action 608. These are then used to updated the filter or actually the PPV limit. The packet filter is then applied: if the packet value of the incoming packet (marked by PV) is less than the threshold value (denoted Filter), action 609 that corresponds to actions 208 and 309, the packet is simply dropped, action 610 that corresponds to actions 209 and 310, otherwise it is forwarded to the buffer, action 611 that corresponds to actions 210 and 311.

Figure 6:
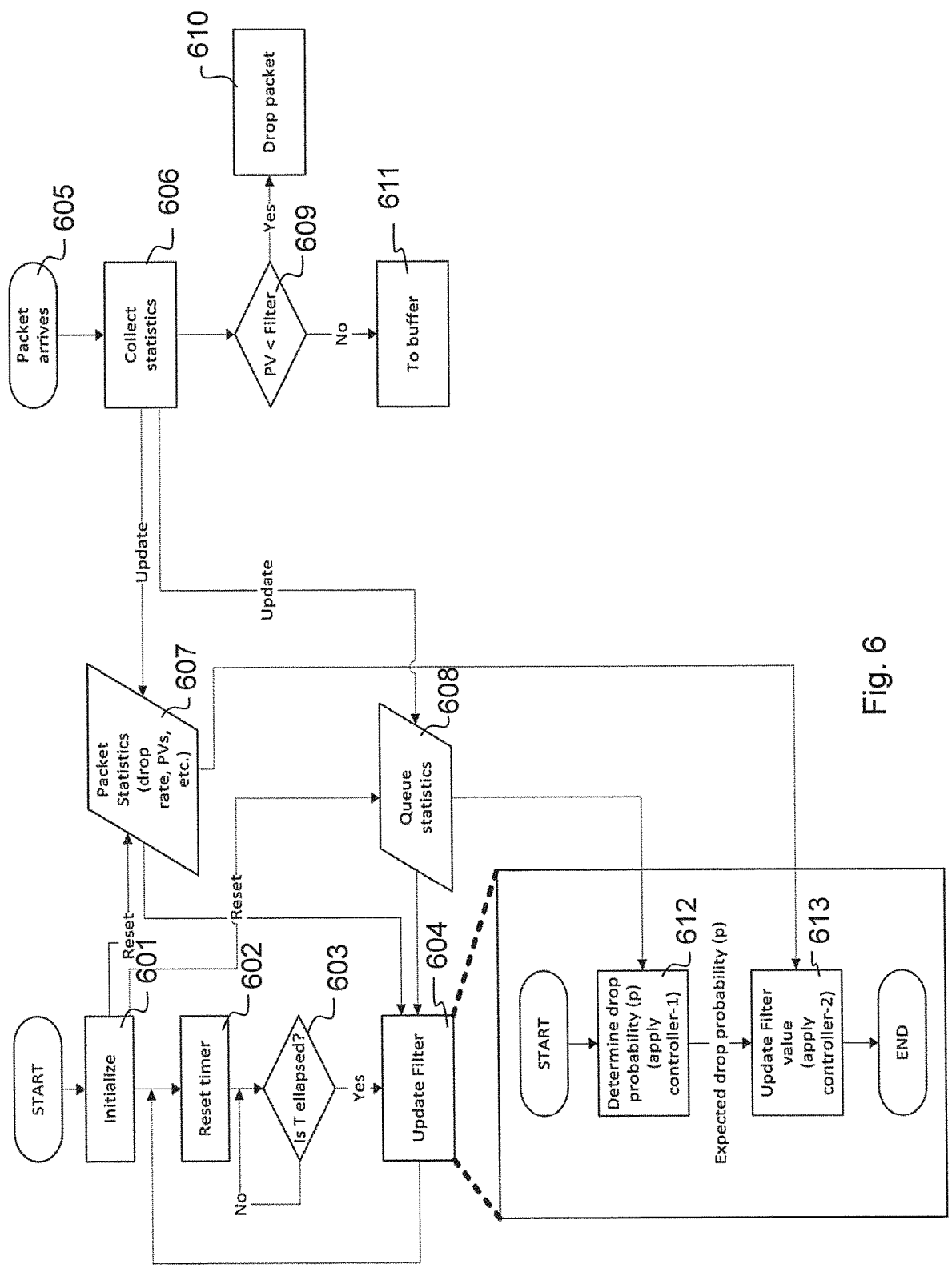
FIG. 6 shows a schematic flowchart according to embodiments herein
Figure 7:
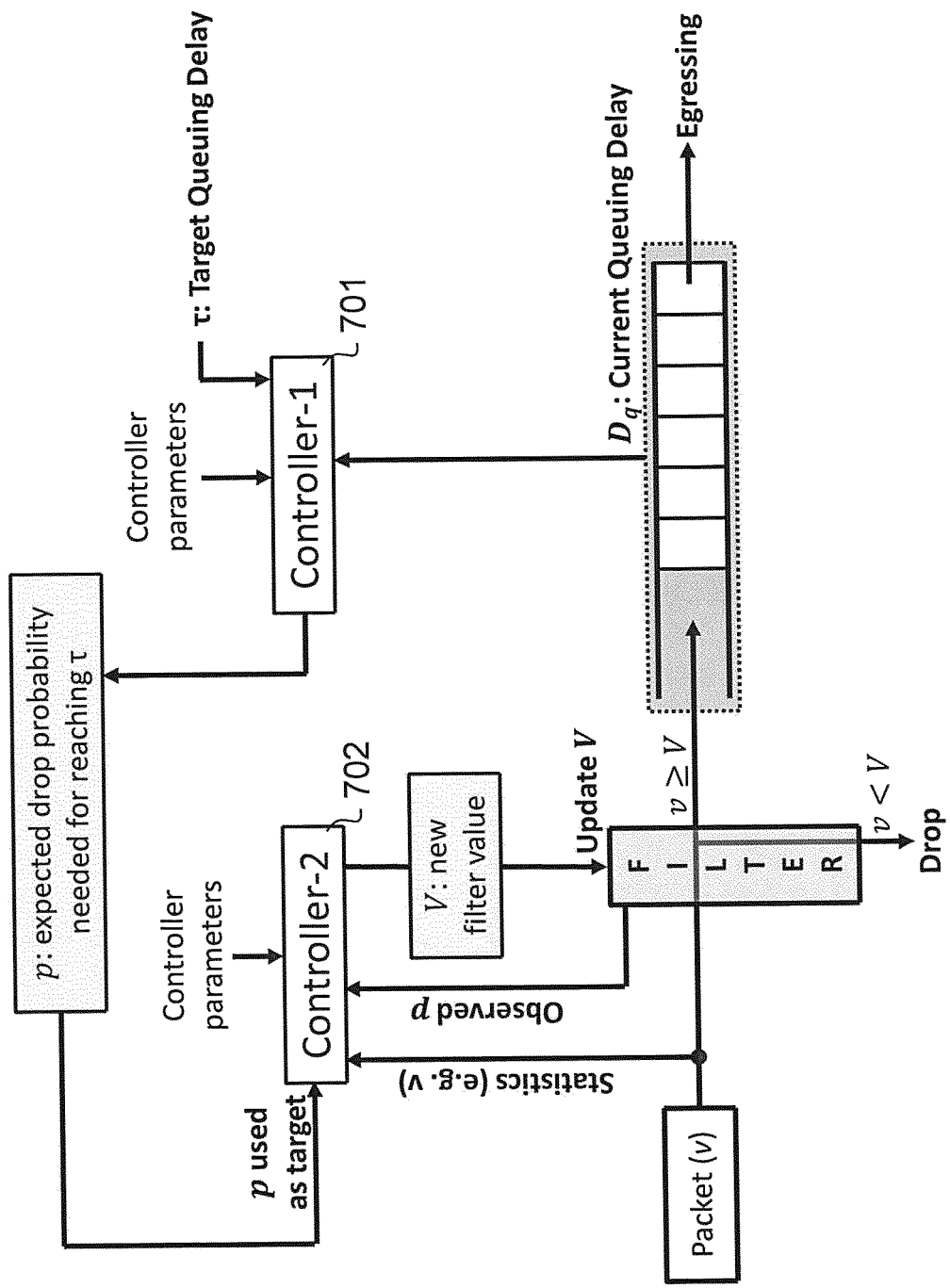
FIG. 7 shows a schematic overview depicting a first communication node according to some embodiments herein.

The compound PPOV-AQM method applies two controllers in the first communication node 10'. A first controller for controlling the drop rate to reduce the observed queuing delay deviation (the error defined previously), see action 612. A second controller for controlling the PPV limit used in the filter to reduce the deviation between the observed and the expected drop rates given by the first controller, see action 613. Accordingly, the first controller is responsible for determining the expected drop rate needed for keeping the queuing delay close to the expected level, while the second controller describes how the PPV limit of the filter should be modified to reach the goal as fast as possible. The compound PPOV-AQM method is depicted in FIG. 6 and FIG. 7. One can observe that Controller-1 701 works as the controllers in the previous PPOV-AQM variants where the target variable ($\tau$: expected queuing delay) was fixed, while Controller-2 702 uses the output of Controller-1 701 as target to be reached and the observed drop probability as the current value to control the PPV limit.

An example implementation: For example, both controllers could be PID controllers (however other kinds of controllers are also possible) where the probability p and the threshold value V may be calculated as follows:

$$p\_new = p\_old + P \times error(t) + I \times \int\_{(x=0)}^{t} error(x)dx + D \times (derror(t))/dt, \quad \text{Controller-1:}$$

$$V\_new = V\_old + P' \times (error)^{\wedge}(t) + I' \times \int\_{(x=0)}^{t} [(error)^{\wedge}(x)dx] + D' \times (d(error)^{\wedge}(t))/dt, \quad \text{Controller-2:}$$

where error(t)=$D\_q$ (t)−$\tau$ and (error)^(t)=p_observed (t)−p_new, where the latter uses the dropping probability provided by Controller-1 as a target value to be reached. Controller-2 aims at modifying the threshold value to accelerate the convergence.

Figure 8:
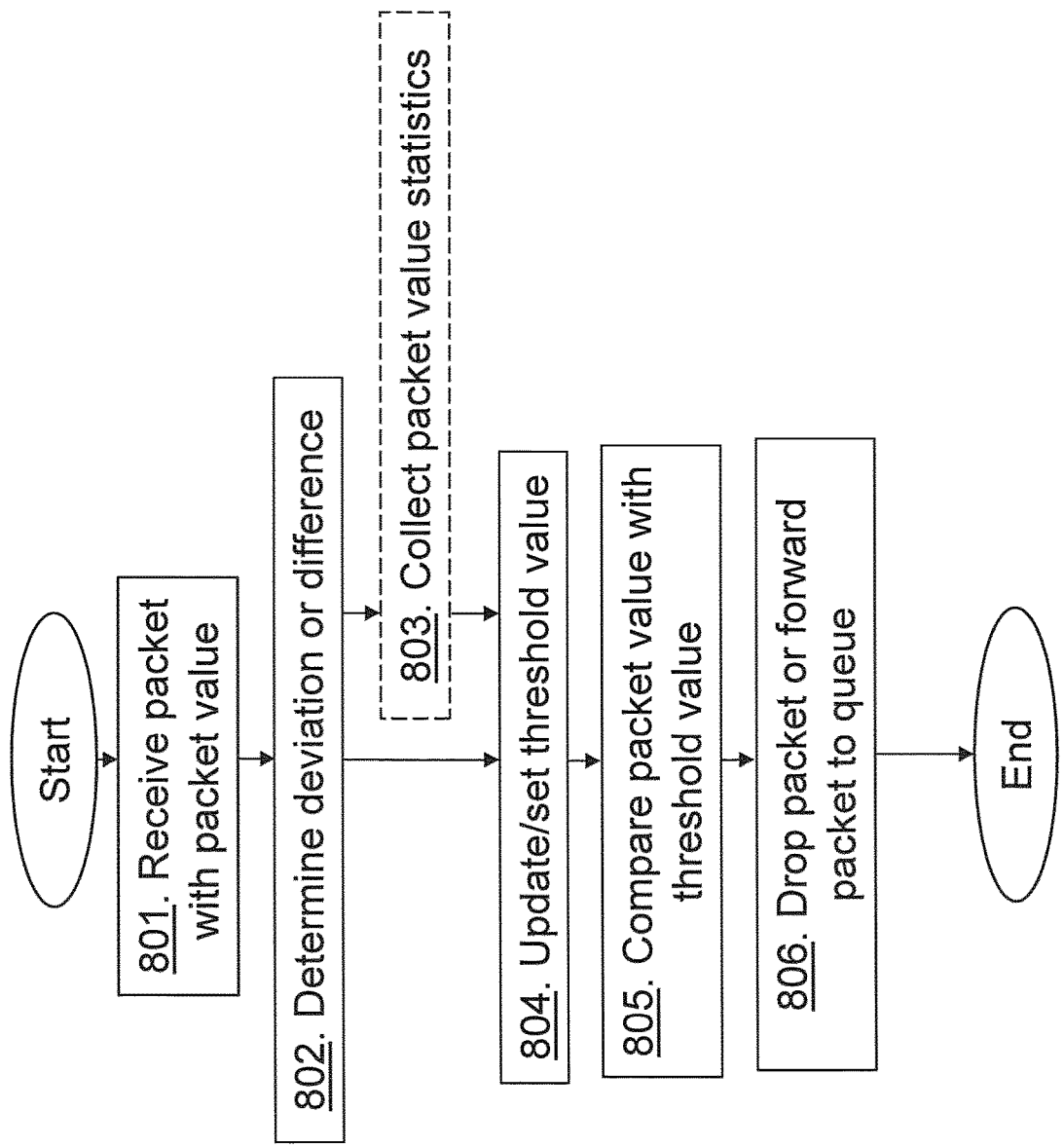
FIG. 8 is a schematic flowchart depicting a method performed by a first communication node according to embodiments herein.

The method actions performed by the first communication node 10' for handling one or more packets in the communications network according to embodiments will now be described with reference to a flowchart depicted in FIG. 8. The actions do not have to be taken in the order stated below, but may be taken in any suitable order. Actions performed in some embodiments are marked with dashed boxes. The first communication node 10' is comprised in the communications network 1.

Action 801. The first communication node 10' receives the packet, from another communication node such as the second communication node 10", with the packet value. The packet value may be related to the level of importance of the packet relative importance of another packet along a linear scale. In some embodiments the first communication node 10' receives a plurality of packets with a respective packet value of a same flow.

Action 802. The first communication node 10' determines the queuing delay of one or more packets in the queue and compares the determined queuing delay with the target queuing delay, hence, the first communication node 10' determines the deviation or the difference of the queuing delay. This deviation or difference is used to determine the dropping probability of packets of the queue e.g. used as the error value to determine the dropping probability of packets of the queue. Thus, the first communication node 10' monitors the deviation of the queuing delay of the first communication node from the target queuing delay value and use this deviation as the error value. This may also be referred to as determining the deviation or the difference of the queuing delay.

Action 803. The first communication node 10' may collect statistics of packet values of incoming packets. For example the first communication node 10' may run a statistic collection function e.g. a distribution function of the incoming packet values. An example for the distribution function is the ECDF. Another example is storing all incoming packet values in a given time window. Thus, the first communication node 10' may run a distribution function of observed packet values.

Action 804. The first communication node 10' determines such as updates or sets the threshold value (PPV limit) based on the error value or the determined dropping probability. The first communication node 10' may further update or set the threshold value based further on the distribution function. Thus, the first communication node 10' determines, may also be expressed as monitoring, the deviation of the queuing delay of the queue from the target queuing delay and uses this deviation or difference as the error value to adjust or determine the threshold value. For example, it is determined which threshold value is set to reach an expected drop rate needed for keeping the queuing delay close to an expected level such as the target queuing delay (may be predefined). The first communication node 10' may determine the threshold value from the determined dropping probability by maintaining the distribution function such as the ECDF of incoming packet values and may determine the threshold value as the Packet Value at that determined dropping probability.

A less storage intensive solution is to estimate the derivative of the distribution function such as the ECDF at the current working point of the system and also take into account the difference between desired and actual packet drop/mark in the last period. Direct control of the PPV limit based on the target queuing delay is also possible with a controller similar to e.g. PIE. Thus, the first communication node 10' may determine the threshold based on the determined deviation of the queuing delay. Note that action 802 and 804 may not be performed for each packet but may be performed periodically, e.g. once during a pre-set time interval.

Action 805. The first communication node 10' compares the packet value with the threshold value. Hence, the first communication node 10' compares the packet value with the threshold value of the outgoing link from the first communication node 10' towards the destination node 11. The threshold value may correspond to the congestion level of the outgoing link.

Action 806. The first communication node 10' further drops or forwards the packet based on the comparison. Hence, the first communication node 10' determines whether to drop or to transmit or forward the packet to the queue for the outgoing link based on the result of the comparison.

Thus, embodiments herein translate a desired or target dropping probability of an existing solution to a packet value filter (i.e. a PPV limit of a filter). The PPV limit may be set by utilizing an ECDF of the incoming packet values. The PPV limit may be set by estimating the derivative of the ECDF at the current working point. The PPV limit may be set by a priori knowledge about the derivative of the ECDF. The PPV limit may be set by taking into account a previous desired dropping probability and the actually experienced dropping probability.

Figure 9:
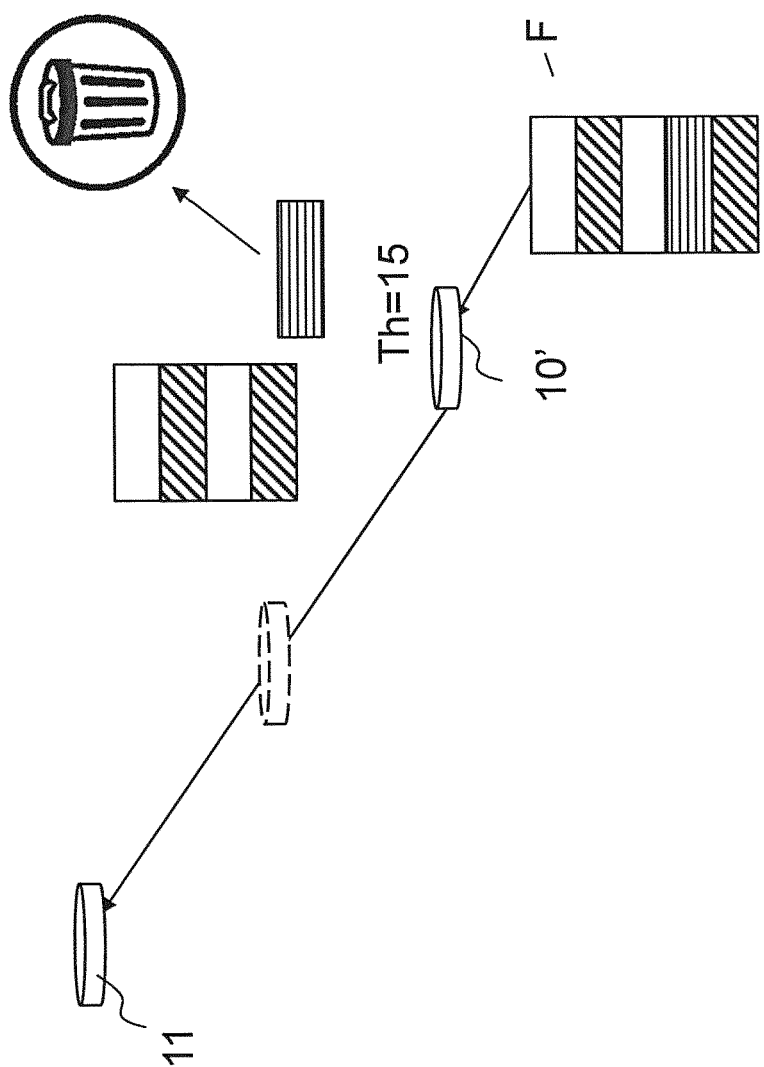
FIG. 9 shows a schematic overview depicting a communications network according to embodiments herein.

FIG. 9 discloses a block diagram depicting the first communication node 10' transmitting packets to the destination node 11. The first communication node 10' receives a flow, F, of packets of different values relating to the service of the different packets, e.g. values '10', '20', '40'. The threshold value, Th, which is a locally generated value according to embodiments herein and may indicate congestion level of the queue towards the destination node 11, is set to 15 i.e. Th=15, which is set based on the queuing delay of the queue. Packets with a packet value of less than 15, in this case the packet with packet value 10, are dropped and the other packets are forwarded to the queue and transmitted towards the destination node 11.

Embodiments herein use the concept of packet values (PV). The packet value may correspond to the level of importance of the packet e.g. along a linear scale. The value indicates a level of importance of the packet relative importance of another packet. For example, the packet value '100' indicates that the packet is 10 times as important as a packet with the value '10' and 100 times as important as a packet with value '1'. The importance may be determined based on the actual contents of the packet payload, e.g. important video frame, or based on the specific packet flow, e.g. premium traffic of gold subscribers, or based on throughput commitments, e.g. whether or not this packet is needed to reach a certain level of throughput, or a combination of these, or any other, criteria. Packet values are carried in each packet and represent the utility the operator gets from delivering one byte of this packet. Thus even if the name implies the packet value of the total packet, the packet value may be multiplied by the length of the packet to get the packet value of the total packet. The name is still packet value to denote the entire concept and differentiate it from flow values. The communications network strives to maximize the total value of packets transmitted.

Figure 10:
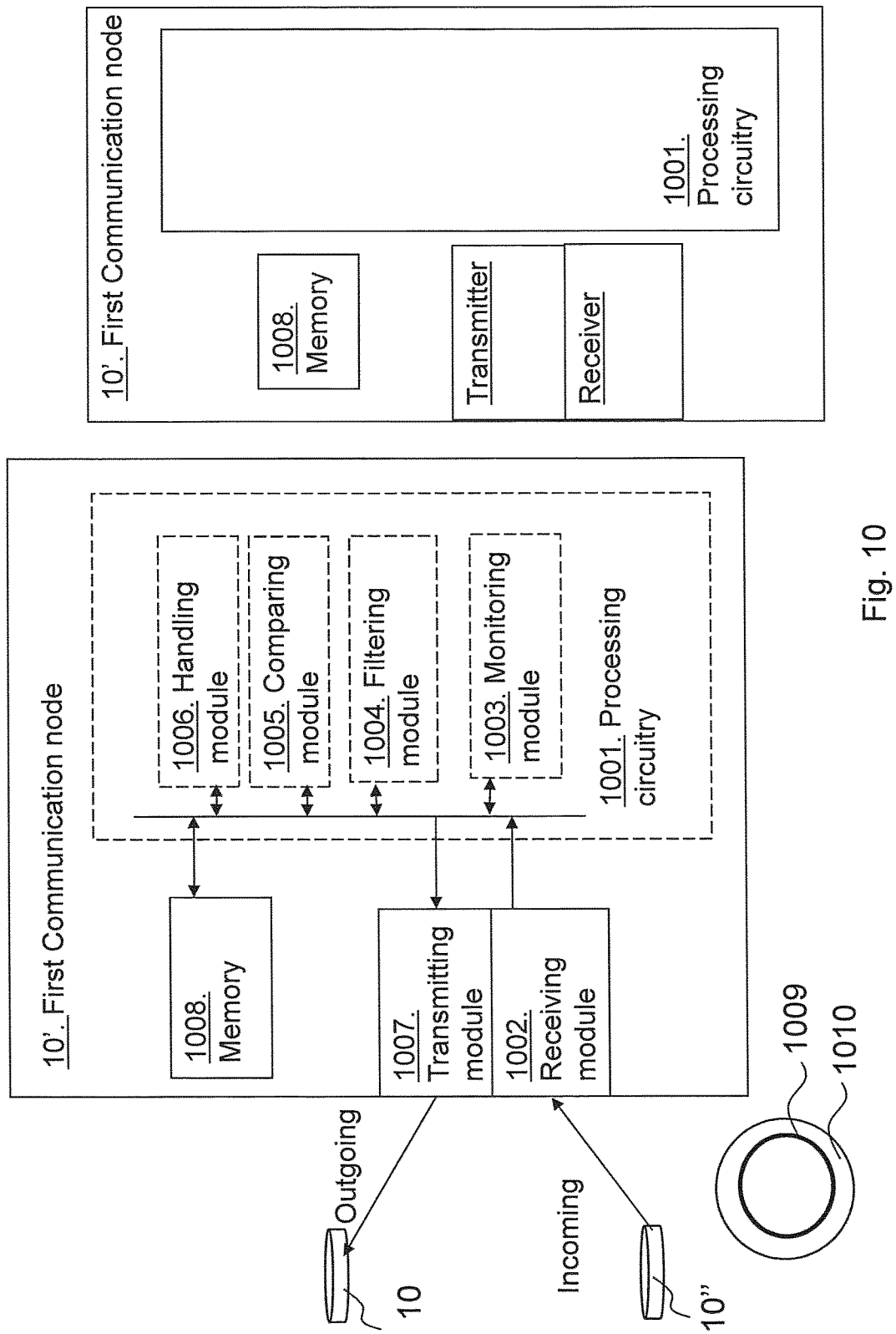
FIG. 10 shows a block diagram depicting a first communication node according to embodiments herein.

FIG. 10 is a block diagram depicting the first communication node 10', exemplified in two embodiments, for handling one or more packets in the communications network such as a packet network. Dashed boxes indicate that the modules/circuitries are optional.

The first communication node 10' may comprise a processing circuitry 1001 such as one or more processors, configured to perform the methods herein.

The first communication node 10' may comprise a receiving module 1002, e.g. a receiver or a transceiver. The first communication node 10', the processing circuitry 1001, and/or the receiving module 1002 is configured to receive the packet, from the other communication node. The packet comprises the packet value related to the level of importance of the packet relative importance of other packets. In some embodiments the first communication node 10' receives a plurality of packets with a respective packet value of a same flow.

The first communication node 10' may comprise a monitoring module 1003. The first communication node 10', the processing circuitry 1001, and/or the monitoring module 1003 is configured to determine the queuing delay of the queue and to compare the determined queuing delay with the predefined expected value resulting in a difference or deviation. In other words, the first communication node 10', the processing circuitry 1001, and/or the monitoring module 1003 is configured to monitor the deviation or difference of the queuing delay. This deviation is used as an error value and/or is used to determine the dropping probability of packets of the queue. The first communication node 10', the processing circuitry 1001, and/or the monitoring module 1003 may be configured to collect packet value statistics of the incoming packets. For example, the first communication node 10', the processing circuitry 1001, and/or the monitoring module 1003 may be configured to run a distribution function of the incoming packet values. For example, the first communication node 10', the processing circuitry 1001, and/or the monitoring module 1003 may be configured to determine the ECDF as the distribution function. Alternatively or additionally, the first communication node 10', the processing circuitry 1001, and/or the monitoring module 1003 may be configured to store all incoming packet values in a given time window. Thus, the first communication node 10', the processing circuitry 1001, and/or the monitoring module 1003 may be configured to run the distribution function of observed packet values.

The first communication node 10' may comprise a filtering module 1004. The first communication node 10', the processing circuitry 1001, and/or the filtering module 1004 is configured to update or set, may also be referred to as adjust or determine, the threshold value (PPV limit) based on the error value or the determined dropping probability. The first communication node 10', the processing circuitry 1001, and/or the filtering module 1004 may further be configured to update or set the threshold value further based on the distribution function. Thus, the first communication node 10' is configured to monitor the deviation of the queuing delay of the queue from the predefined expected value and use this difference as the error value to adjust or determine the threshold value. For example, the first communication node 10', the processing circuitry 1001, and/or the filtering module 1004 may be configured to determine which threshold value is set to reach an expected drop rate needed for keeping the queuing delay close to the expected level. The first communication node 10', the processing circuitry 1001, and/or the filtering module 1004 may be configured to determine the threshold value from the determined dropping probability by maintaining an empirical Cumulative Distribution Function (eCDF) of incoming packet values and to determine the threshold value as the Packet Value at that determined dropping probability.

The first communication node 10', the processing circuitry 1001, and/or the filtering module 1004 may be configured to estimate the derivative of the ECDF at the current working point of the system and also to take into account the difference between desired and actual packet drop/mark in the last period. Direct control of the PPV limit based on the target queuing delay is also possible with a controller similar to e.g. PIE.

The first communication node 10' may comprise a comparing module 1005. The first communication node 10', the processing circuitry 1001, and/or the comparing module 1005 is configured to compare the packet value with the threshold value. Hence, the first communication node 10', the processing circuitry 1001, and/or the comparing module 1005 is configured to compare the packet value with the threshold value e.g. of the outgoing link from the first communication node 10' towards the destination node 11.

The threshold value corresponds may correspond to or is associated with a congestion level of the outgoing link.

The first communication node 10' may comprise a handling module 1006. The first communication node 10', the processing circuitry 1001, and/or the handling module 1006 is configured to drop or to forward the packet based on the comparison. Hence, the first communication node 10', the processing circuitry 1001, and/or the handling module 1006 may be configured to determine whether to drop or to transmit or forward the packet to the queue for the outgoing link based on the result of the comparison.

The first communication node 10' may comprise a transmitting module 1007, e.g. a transmitter or a transceiver. The first communication node 10', the processing circuitry 1001, and/or the transmitting module 1007 may be configured to transmit the packet from the queue.

The first communication node 10' further comprises a memory 1008. The memory 1008 comprises one or more units that may be used to store data on, such as, packet values, bandwidth, threshold values, distribution function, curves, applications to perform the methods disclosed herein when being executed, and similar.

The methods according to the embodiments described herein for the first communication node 10' may respectively be implemented by means of e.g. a computer program 1009 or a computer program product, comprising instructions, i.e., software code portions, which, when executed on at least one processor, cause the at least one processor to carry out the actions described herein, as performed by the first communication node 10'. The computer program 1009 may be stored on a computer-readable storage medium 1010, e.g. a disc or similar. The computer-readable storage medium 1010, having stored thereon the computer program, may comprise the instructions which, when executed on at least one processor, cause the at least one processor to carry out the actions described herein, as performed by the first communication node 10'. In some embodiments, the computer-readable storage medium may be a non-transitory computer-readable storage medium. Thus, the first communication node 10' may comprise the processing circuitry and the memory, said memory comprising instructions executable by said processing circuitry whereby said communication node is operative to perform the methods herein.

Using values or packet values as described herein allow both differentiating packets and controlling resource sharing within bearers and among bearers over different packet networks with a single mechanism. That is, it is easy and natural to up-prioritize a sub-flow of a bearer or the first few packets of a flow. Differentiation is equally simple for best-effort and special traffic, even within a single bearer. In addition, other cases, such as giving priority to the first layer of videos for all users over their other traffic are also easy to realize.

E.g. PPOV supports a wide range of resource sharing policies, but fits QoE related policies especially well, when we focus on the value of each traffic piece to the destination node. Even handling for single packets may be defined, e.g. up-prioritize TCP start-up or ping. Since the resource sharing is defined by the packet marking, avoiding any impact or reconfiguration in the RAN, this can be especially easy to set up or reconfigure. In this way, the solution is extremely scalable and flexible in terms of setting up lots of different policies for the operator. Even on-the-fly reconfiguration of marking policies is possible, based on traffic measurements or analytics.

One option to define the packet values is to base it on the throughput of a given flow. The resource sharing can be described by the throughput-value curve. This allows an easy to understand visual representation of the resource sharing for a wide range of congestion levels. In addition, the slope of the curves determines the trade-off between throughput fairness and bandwidth utilization of the resource sharing in case of varying radio channel conditions. By choosing the intended value curve, the fairness-utilization trade-off may be influenced on a per service basis, and also dependent on the experienced service quality.

In addition to resource sharing over the air interface, the framework may be used to share many type of scarce resource. Possible examples are: buffer memory, packet processing resources.

According to a first embodiment herein, a method performed by a first communication node 10' for handling one or more packets in a communications network is herein provided. The first communication node 10' is comprised in the communications network 1. The method comprises receiving a packet, from a second communication node, with a packet value;

determining a queuing delay of one or more packets in a queue;

comparing the determined queuing delay with a target queuing delay resulting in a deviation;

using the deviation to determine a dropping probability of packets of the queue;

setting a threshold value based on the determined dropping probability; and comparing the packet value with the threshold value; and dropping the packet or forwarding the packet to the queue based on the comparison The method according to the first embodiment, further comprising collecting statistics of packet values of incoming packets; and.

setting the threshold value also taking the collected statistics into account

The method according to the first embodiment, wherein collecting statistics comprises determining the ECDF and the setting the threshold value based on the determined dropping probability comprises maintaining the ECDF of incoming packet values and determining the threshold value as a packet value at that determined dropping probability.

The method according to the first embodiment, wherein collecting statistics comprises estimating a derivative of the ECDF at a current working point and also take into account a difference between desired and actual packet drop/mark in a period.

The threshold value may correspond to the congestion level of the outgoing link and/or the packet value may correspond to an importance level of the packet.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a communication node, for handling one or more jobs, wherein said communication node receives a job over an incoming link, which job has a job value, wherein said method comprises:

determining, by said communication node, a deviation of a queuing delay of the communication node from a target queueing delay value;

using, by said communication node, said deviation as an error value to determine a dropping probability, which is used to determine a threshold value, wherein said threshold value corresponds to or is associated with a congestion level of a queue of the job;

comparing, by said communication node, the job value with the threshold value and establishing that said job value is below said threshold value; and dropping, by said communication node, said job, based on said comparison.

2. The method of claim 1, wherein said method further comprises:

maintaining, by said communication node, a distribution function of job values, and determining, by said communication node, the threshold value based on said maintained distribution function.

3. The method of claim 1, wherein said method further comprises:

estimating, by said communication node, a derivative of a distribution function at a working point; and determining, by said communication node, the threshold value based on said estimate and based on the deviation or difference between a desired and an actual job drop level.

4. The method of claim 1, wherein said job is a packet and wherein said job value is a packet value.

5. A communication node arranged for handling one or more jobs, wherein said communication node is arranged to receive a job over an incoming link, which job has a job value, and wherein said communication node is arranged to:

determine a deviation of a queuing delay of the communication node from a target queueing delay value; and use said deviation as an error value to determine a dropping probability, which is used to determine a threshold value, wherein said threshold value corresponds to or is associated with a congestion level of a queue of the job;

compare the job value with the threshold value and establish that said job value is below said threshold value; and drop said job, based on said comparison.

6. The communication node of claim 5, wherein said communication node is further arranged to:

maintain a distribution function of job values; and determine the threshold value based on said maintained distribution function.

7. The communication node of claim 5, wherein said communication node is further arranged to:

estimate a derivative of a distribution function at a working point; and determine the threshold value based on said estimate and based on the deviation or difference between a desired and an actual job drop level.

8. The communication node of claim 5, wherein said job is a packet and wherein said job value is a packet value.

* * * * *